United States Patent [19]

Brasseur

[11] 3,774,465

[45] Nov. 27, 1973

[54] SPROCKET WHEEL FOR SNOWMOBILE OR THE LIKE

[75] Inventor: Gill Brasseur, Kingsbury, Quebec, Canada

[73] Assignee: Bombardier Limited, Valcourt, Quebec, Canada

[22] Filed: Apr. 21, 1972

[21] Appl. No.: 246,166

[30] Foreign Application Priority Data
Mar. 1, 1972 Canada.............................. 135,998

[52] U.S. Cl............................................. 74/243 R
[51] Int. Cl............................................. F16h 55/16
[58] Field of Search.............. 74/243 R; 301/63 PW; 305/21; 180/6

[56] References Cited
UNITED STATES PATENTS

| 2,720,119 | 10/1951 | Sherman | 74/243 R |
| 3,483,766 | 12/1969 | Erickson | 74/243 R |
| 3,666,322 | 5/1972 | Pickson | 74/243 R |
| 3,504,562 | 10/1968 | Hirych | 74/243 R |

FOREIGN PATENTS OR APPLICATIONS

| 521,164 | 1/1956 | Canada | 74/243 R |

Primary Examiner—Manuel A. Antonakas
Assistant Examiner—Allan Russell Burke
Attorney—Roberts B. Larson et al.

[57] ABSTRACT

A sprocket wheel consisting of a circular body formed of an elastomeric material, such as rubber, and having a series of teeth formed in circumferentially equally spaced arrangement about the outer periphery thereof. The improvement consists in bonding to the outer periphery of the body at least one layer of reinforcing fabric material, such as nylon webbing. This construction ensures longer wear-life to the sprocket wheel.

7 Claims, 5 Drawing Figures

SPROCKET WHEEL FOR SNOWMOBILE OR THE LIKE

This invention relates to an improved sprocket wheel.

Sprocket wheels are used principally for transmitting power. Their utilization is considerable in vehicles, such as snowmobiles, which are adapted to travel on soft surfaces. These vehicles are usually propelled by one or more endless tracks which have one or two rows of apertures which are drivingly engaged by the teeth of sprocket wheels. The tracks are made of an elastomeric material and are usually reinforced transversely by means of rods integrally mounted in the elastomeric material. It has been generally accepted in the snowmobile art to measure the life span of a track with reference to the length of time the rods remain secured in place in the elastomeric material.

When snowmobiles first came on the market, they were equipped with low-power engines (from 6 to 10 HP); the sprocket wheels used were made of ordinary rubber and their average life span was considered satisfactory at the time. Since then, the power of engines has considerably increased as well as the performance expected of the snowmobile; the sprocket wheels were thus made more wear-resistant by being made of stronger material to avoid excess stress in the sprocket teeth. More rigid material, such as polyurethane, was substituted for rubber. However, the substitution has resulted in reducing the average life span of the endless track: since flexibility was no longer present in the sprocket teeth, any non-uniformity present in the spacing between successive apertures of the track often resulted in having continuously only one sprocket tooth in driving engagement with the track thereby imposing an overload on the working surfaces of the elastomeric material and, more particularly, on the rods inside the material. This problem has been partially solved on present snowmobiles of average performance by providing sprocket wheels made of glass filled rubber. However, on some more recent snowmobiles where both power and weight have been further increased, there is a need for stronger wear-resistant sprocket wheels made of a material, however, which would not be damaged too rapidly by the snowmobile track.

It is an object of this invention to provide an improved sprocket wheel characterized by a high degree of a well balanced resiliency and wear-resistance combination.

It is also an object of this invention to provide a sprocket wheel, for use in a snowmobile-like vehicle, wherein the sprocket wheel is formed of a resilient material, such as rubber, and wherein a layer of wear-resistant material, such as a nylon webbing, is bonded adjacent the outer periphery of the sprocket wheel. Bonding the outer periphery of the sprocket wheel with a layer of fabric material provides tensile strength to the sprocket peripheral surfaces and greatly reduces the stress in the elastomeric material.

Additional layers of fabric material may be provided near the outer periphery in superposed relationship, the number of layers being determined by the engine power of the vehicle being driven. In such a case, the rubber between the layers act as a cushion upon engagement of the sprocket wheel with the track. It is to be noted that the addition of layers of fabric material tends to reduce the flexibility of the sprocket wheels and, hence, a well balanced combination is desired and easily determinable by the man skilled in the art. It has also been found that the provision of a very thin layer of rubber extending over the uppermost layer of fabric material heightens tbe sprocket's resistance to an abrasive medium of sand, salt or dust, for example.

The present invention relates to a sprocket wheel which comprises a circular body formed of elastomeric material, the body having a series of radial projections formed in circumferentially equally spaced arrangement about the outer periphery thereof and extending outwardly therefrom, and at least one layer of reinforcing fabric material disposed along the outer periphery of the body, the fabric material being bonded to the elastomeric material.

The above and other objects of the present invention will become more readily apparent by reference to the accompanying drawings in which preferred embodiments are disclosed by way of examples, various modifications and changes of detail thereof being contemplated within the scope of the accompanying claims. The article of the invention is illustrated on the accompanying drawing in which:

Figures 1, 2, 3, 3A:
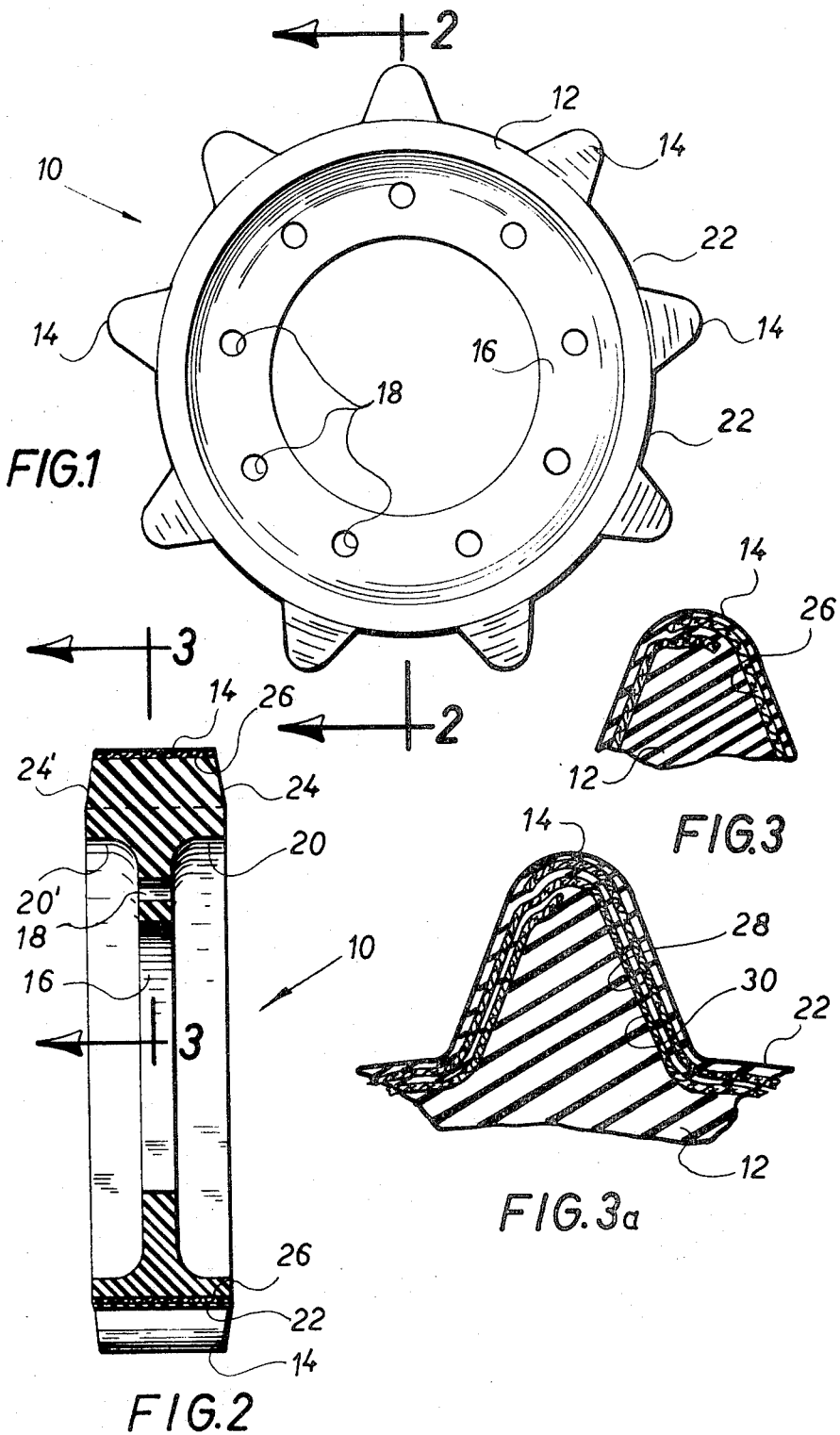
FIG. 1 is a side view of the sprocket wheel of the present invention.
FIG. 2 is a cross-sectional view taken along lines 2—2 of FIG. 1.
FIG. 3 is a fragmentary enlarged sectional view taken along through the central plane of the sprocket wheel as indicated by lines 3—3 of FIG. 2.
FIG. 3a is a sectional view similar to that of FIG. 3, but illustrating another form of the invention.

Referring now to FIGS. 1 and 2, the sprocket wheel 10 consists of a body formed of an elastomeric material such as rubber or like resilient material. The sprocket wheel body is in the form of a ring including a rim portion 12 displaying a series of radial projections 14 formed in circumferentially equally spaced arrangement about the outer periphery thereof and extending outwardly therefrom. The ring further includes a circular flange portion 16 extending inwardly of the rim portion 12; a plurality of radial apertures 18 are formed through the flange portion and are adapted to receive therethrough fastening means as hereinbelow described with reference to FIG. 4. The thickness of the flange portion 16 is preferably smaller than that of the rim portion 12 so that metallic flanges may be received within the body and surrounded by the inner faces 20, 20' of the rim portion 12. The teeth 14 and the spaces adjacent the teeth, designated as troughs 22, define peripheral surfaces which are adapted to come in driving engagement witb the edges of the apertures of a snowmobile track. The sidewalls 24, 24' of the teeth are slightly inwardly inclined for easy insertion into the track apertures.

The present invention consists in bonding to the elastomeric material adjacent the outer periphery of the rim portion 12 a webbing or layer 26 of reinforcing wear-resistant fabric material such that the fabric layer extends across the sprocket wheel transversely of the central plane thereof. The composition of the faric webbing 26 is preferably of nylon, but may be of any well known conventional natural or synthetic textile material such as cotton, rayon or polyester. The layer 26 extends along all the peripheral surfaces of the rim portion 12 including the tooth surfaces and the trough surfaces. Preferably, for maximum tensile strength, the webbing should cover the entire width of the rim portion 12. In the present practice of the invention, the layer 26 is secured integrally onto the peripheral surfaces of the rim portion 12 of the ring by bonding by vulcanization: the nylon webbing is first placed in a suitable mold and the crude rubber is added. Both materials are then treated to form the sprocket wheel. Those skilled in the art will be aware of other methods of bonding a webbing material to an elastomeric material.

The invention thus consists in a unique driving sprocket having a body formed of a resilient material with a layer of nylon webbing securely bonded around the outer periphery thereof. Thus, when the sprocket teeth are engaged in a positive driving manner with the apertures of an endless track, this type of construction enables the nylon webbing to increase tensile strength of wear points thereby considerably reducing the strain efforts in the elastomeric material. On the other hand, the elastomeric material provides the desired resiliency for smooth engagement between sprocket wheel and track.

FIG. 3a illustrates another form of the invention where two layers 28 and 30 are represented as extended around the periphery of the rim portion 12. The elastomeric material located between these layers act as a cushion during driving engagement. The selection of layers will be determined by reference to the power of the vehicle engine.

FIGS. 3 and 3a show that the extremities of the nylon webbing terminate near the apex of a tooth; this is preferable since this is the area on the periphery of the sprocket wheel which is less subject to tensile strength during driving engagement.

Figure 4:
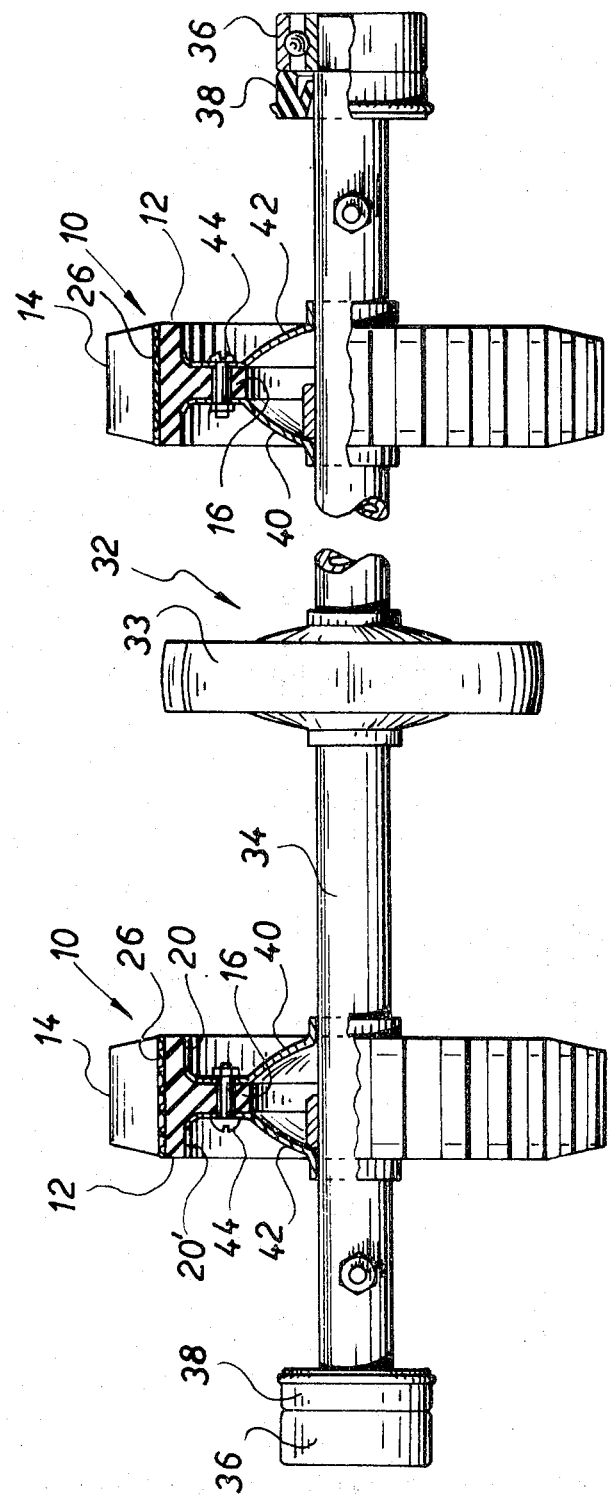
FIG. 4 is a front elevational view, partly broken away, of a snowmobile axle on which are mounted two sprocket wheels made in accordance with the present invention.

Referring to FIG. 4, a snowmobile axle 32 is shown on which two sprocket wheels 10 embodying the present invention are mounted on a shaft 34 and are equally spaced thereon from a centrally disposed idler wheel 33. The extremities of shaft 34 are provided with bearing means 36 and seal means 38 for proper assembly within the confines of the inverted U-shaped chassis (not shown) of a conventional snowmobile. Each sprocket wheel is secured on shaft 34 by means of an inner metallic flange 40 welded to the shaft 34 and by means of an outer mobile metallic flange 42 which is moved toward the opposite side of the sprocket wheel and fastened to flange 40 by means of bolts 44 extending through both flanges 40 and 42 and flange portion 16 of the sprocket wheel 10.

Although the invention has been described above in relation to two specific forms of the invention, persons skilled in the art will be aware that it may be refined and modified in various ways. It is therefore wished to have it understood that the present invention is not limited in interpretation except by the terms of the following claims.

The embodiments of the invention in which an exclusive property or privilege is claimed are defined as follows:

1. A sprocket wheel comprising a circular body formed of elastomeric material, said body having a series of radial projections formed in circumferentially equally spaced arrangement about the outer periphery thereof and extending radially outwardly therefrom to define with troughs between the projections the outer periphery of the sprocket wheel; and at least one layer of reinforcing fabric material extending across the sprocket wheel transverse to the central plane thereof and disposed along the said outer periphery of the sprocket wheel, said fabric material being bonded to said elastomeric material.

2. A sprocket wheel as defined in claim 1, wherein said elastomeric material is rubber and said fabric material consists of a nylon webbing.

3. A sprocket wheel for driving an apertured endless track used in a snowmobile-type vehicle comprising a ring formed of rubber material, said ring including a rim portion having a series of radial teeth formed in circumferentially equally spaced arrangement about the outer periphery thereof and extending radially outwardly therefrom; and at least one layer of reinforcing wear-resistant fabric material extending across the sprocket wheel transverse to the central plane thereof and disposed along the said outer periphery of said rim, said fabric material being bonded to said rubber to thereby augment the tensile strength of said ring about the said outer periphery thereof while maintaining sufficient resiliency as the teeth engage the apertured track.

4. A sprocket wheel as defined in claim 3, wherein said fabric material is a nylon webbing.

5. A sprocket wheel as defined in claim 4, wherein the circumferential ends of said layer of fabric material join adjacent the apex of a tooth; said nylong webbing extending the entire axial width of said rim portion.

6. A sprocket wheel as defined in claim 5 wherein said ring further includes a circular flange portion extending radially inwardly of said rim, said flange portion being provided with a plurality of radially disposed apertures extending axially therethrough.

7. A sprocket wheel for driving an apertured endless track used in a snowmobile-type vehicle comprising a ring formed of rubber material, said ring including a rim portion having a series of radial teeth formed in circumferentially equally spaced arrangement about the outer periphery thereof and extending radially outwardly therefrom; and at least one layer of reinforcing wear-resistant fabric material extending across the sprocket wheel transverse to the central plane thereof and disposed adjacent the said outer periphery of said rim, said fabric material being bonded to said rubber material and being slightly spaced radially inwardly from said outer periphery so as to leave around the said outer periphery of said ring a thin layer of rubber material to render said ring more resistant when used in an abrasive medium.

* * * * *